(12) United States Patent
Brunner

(10) Patent No.: US 11,506,248 B2
(45) Date of Patent: Nov. 22, 2022

(54) FREEWHEEL

(71) Applicant: Dr. Ing. h.c. F. Porsche Aktiengesellschaft, Stuttgart (DE)

(72) Inventor: Michael Brunner, Renningen (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 0 days.

(21) Appl. No.: 17/363,183

(22) Filed: Jun. 30, 2021

(65) Prior Publication Data

US 2022/0003281 A1 Jan. 6, 2022

(30) Foreign Application Priority Data

Jul. 1, 2020 (DE) ...................... 10 2020 117 325.3

(51) Int. Cl.
*F16D 41/16* (2006.01)
*B60K 17/08* (2006.01)
*F16H 3/44* (2006.01)

(52) U.S. Cl.
CPC .............. *F16D 41/16* (2013.01); *B60K 17/08* (2013.01); *F16H 3/44* (2013.01); *F16H 2200/2005* (2013.01); *F16H 2200/2082* (2013.01)

(58) Field of Classification Search
CPC ............... F16D 41/12–16; F16D 41/30; F16H 2200/2066
See application file for complete search history.

(56) References Cited

U.S. PATENT DOCUMENTS

| | | | | |
|---|---|---|---|---|
| 8,267,231 B2 * | 9/2012 | Holmes | ................. | B60K 6/445 192/43.1 |
| 9,855,830 B2 | 1/2018 | Knoblauch | | |
| 11,242,915 B1 * | 2/2022 | Lee | ......................... | F16H 3/666 |
| 2004/0159517 A1 * | 8/2004 | Thomas | ................. | F16D 41/16 192/39 |
| 2010/0252384 A1 | 10/2010 | Eisengruber | | |
| 2015/0323020 A1 * | 11/2015 | Papania | ................. | F16D 41/14 74/665 GE |
| 2017/0074378 A1 | 3/2017 | Kirchner | | |
| 2017/0130784 A1 * | 5/2017 | Eber | ...................... | F16D 41/16 |
| 2018/0283550 A1 * | 10/2018 | Yamagishi | ............ | F16D 41/125 |
| 2022/0003280 A1 * | 1/2022 | Brunner | ............... | F16D 41/125 |

FOREIGN PATENT DOCUMENTS

| | | |
|---|---|---|
| DE | 69826657 T2 | 10/2005 |
| DE | 102014117227 A1 | 5/2016 |
| DE | 102015104203 A1 | 9/2016 |
| DE | 102015217521 A1 | 3/2017 |

\* cited by examiner

*Primary Examiner* — David R Morris
*Assistant Examiner* — Lillian T Nguyen
(74) *Attorney, Agent, or Firm* — RatnerPrestia

(57) ABSTRACT

A freewheel has a first ring which has a first blocking contour on a first axial side and a second ring which is rotatable relative to the first ring and which has a second blocking contour on a second axial side pointing toward the first axial side of the first ring. Tiltable blocking bodies can be caused to engage into the first blocking contour and into the second blocking contour. A switching element tilts the blocking bodies. A displacement unit axially displaces the second blocking contour relative to the first ring between an active setting, which is axially approximated to the first ring, and an inactive setting, which is axially remote from the first ring and in which torque-transmitting blocking of the first ring with the second ring is prevented in any setting of the blocking bodies.

8 Claims, 2 Drawing Sheets

FREEWHEEL

CROSS-REFERENCE TO RELATED APPLICATION

Figure 1:
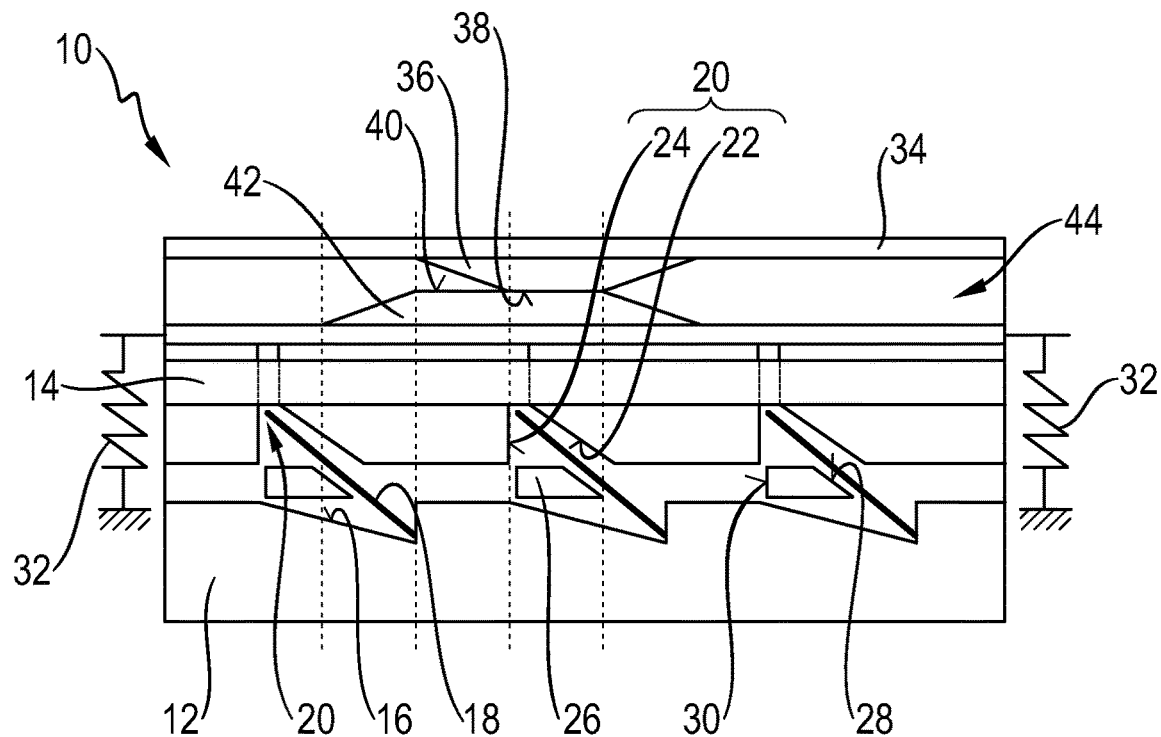

This application claims priority to German Patent Application No. 10 2020 117 325.3, filed Jul. 1, 2020, the content of such application being incorporated by reference herein in its entirety.

FIELD OF THE INVENTION

The invention relates to a switchable freewheel, by means of which the transmission characteristic of a planetary transmission of a motor vehicle transmission can be adapted to different operating situations.

BACKGROUND OF THE INVENTION

DE 10 2014 117 227 A1, DE 10 2015 104 203 A1 and DE 10 2015 217 521 A1, each of which is incorporated by reference herein, have each disclosed a motor vehicle transmission for converting a torque that is generated by an electric machine.

There is a constant demand to adapt the transmission characteristic of a planetary transmission of a motor vehicle transmission to different operating situations with little wear and in a structural-space-saving manner.

SUMMARY OF THE INVENTION

Described herein is an adaptation of the transmission characteristic of a planetary transmission of a motor vehicle transmission to different operating situations with little wear and in a structural-space-saving manner.

The invention relates to a freewheel for changing a transmission characteristic of a planetary transmission for a motor vehicle transmission, having a first ring which has a first blocking contour on a first axial side, a second ring which is rotatable relative to the first ring and which has a second blocking contour on a second axial side pointing toward the first axial side of the first ring, tiltable blocking bodies which can be caused to engage into the first blocking contour and into the second blocking contour, a switching element for tilting the blocking bodies, and a displacement unit for axially displacing the second blocking contour relative to the first ring between an active setting, which is axially approximated to the first ring and in which a blocking setting of the blocking bodies can be established which transmits torque between the first ring and the second ring, and an inactive setting, which is axially remote from the first ring and in which torque-transmitting blocking of the first ring with the second ring is prevented in any setting of the blocking bodies.

If the switchable freewheel is used in a planetary transmission of a motor vehicle transmission, in particular instead of a brake, for example in order to selectively, in particular immovably, hold a sun gear or ring gear of the planetary transmission or allow said sun gear or ring gear of the planetary transmission to freewheel, the transmission ratio of the planetary transmission can be easily varied by means of the switching setting of the switching element in the freewheel. When the freewheel holds the corresponding transmission component of the planetary transmission, a different overall transmission ratio takes effect for the planetary transmission than when the freewheel allows said transmission component to rotate freely. In this way, a transmission with 2 gear ratios can be implemented very easily.

In a parking situation of the motor vehicle, the freewheel may be switched into its blocking position, in which, for example, the planetary transmission may be immovably blocked by means of the clutch and an onward movement of the motor vehicle is not possible. However, if the motor vehicle is parked on a gradient, the downgrade force acting on the motor vehicle can seek to move the motor vehicle forward or rearward. Owing to the blocked transmission, this can have the effect that opposing torques act on the first switching contour and on the second switching contour, which torques cause the blocking bodies to be additionally clamped between the blocking contours. If the switching element, in this situation, seeks to tilt the intensely clamped blocking bodies, in particular in order to allow bidirectional freewheeling and, for this purpose, eliminate a coupling between the first ring and the second ring, particularly high friction forces have to be overcome. For this purpose, the actuator arrangement for the switching element would have to be greatly overdimensioned in order to be able to switch the freewheel out of the blocking setting even in the case of extremely steep underlying surfaces. Furthermore, this would be possible only with considerable friction-induced wear.

By means of the displacement unit, it is however possible for the axial spacing between the first ring and the second blocking contour of the second ring to be increased to such an extent that, in the more greatly spaced-apart inactive setting of the second blocking contour with respect to the first ring, contact of the blocking bodies with at least one of the blocking contours is no longer possible. In particular, the second blocking contour is configured as a component which is separate from the rest of the second ring, wherein the separate second blocking contour is received in rotationally conjoint but axially relatively displaceable fashion in the rest of the second ring. The spacing of the first ring and of the second ring can thus remain constant, whilst only the second blocking contour, which is received in torque-transmitting fashion in the rest of the second ring, is displaced by the displacement unit. Alternatively, the second blocking contour may be configured so as to be fixed in terms of movement in the second ring, and the displacement unit may displace the entire second ring, including the second blocking contour, in the axial direction relative to the first ring. Preferably, during the axial displacement of the second blocking contour relative to the first ring from the active position into the inactive position, a relative rotation of the second ring relative to the first ring also occurs in order to move the blocking stops, which engage tangentially on the blocking bodies, of the blocking contours away from one another in the circumferential direction. By means of the relative rotation, for which even a very small angle range is sufficient, the acting friction forces can be greatly reduced. By means of the axial relative movement, the respective blocking body can slide at a more favourable angle on the associated blocking stop of the blocking contour that is moved axially relative to the blocking body than if the switching element were to seek to rotate said blocking contour away by means of a tilting of the blocking body. Owing to the increase, achieved by the displacement unit, of the axial spacing of the second blocking contour to the first ring, the torque-transmitting blocking of the first ring with the second ring can be eliminated with little wear and with a small structural space requirement, such that an adaptation of the transmission characteristic of a planetary transmission of a motor vehicle transmission to different operating situations is made possible with little wear and in a structural-space-saving manner.

The blocking bodies of the freewheel may be configured in particular as pawls. The blocking body may for example be mounted pivotably at one end on the first ring, in particular within the first blocking contour. It is particularly preferable if a spring element engages on the respective blocking body, in particular in order to automatically push the blocking body into the second blocking contour. The first ring and the second ring may be configured as rings which are offset coaxially with respect to one another in an axial direction and on the mutually facing axial sides of which the blocking contours are formed, wherein the blocking bodies and a switching finger which protrudes in a radial direction from the switching element may be provided in an axial intermediate space between the rings.

In particular, the switching element is coupled to the displacement unit in order to establish the active setting, the inactive setting and possibly the blocking setting in a manner dependent on the rotational angle position of the switching element. It can thus be ensured that the change from the active setting of the ring to the inactive setting of the rings and back occurs only when the switching element seeks to tilt the blocking bodies out of the torque-transmitting blocking setting. An unintentional change between the active setting and the inactive setting of the rings can be avoided. For example, the switching element may be coupled to the displacement unit such that a rotation of the switching element in a particular predefined circumferential angle range in the displacement unit can be converted into an axial relative movement of the second blocking contour of the second ring with respect to the first ring.

It is preferably provided that the switching element, in a blocking position, clamps the blocking bodies immovably to the first blocking contour and to the second blocking contour, in a freewheel position, allows unidirectional freewheeling, and in an inactive position, holds the blocking bodies down on the first ring so as to be spaced apart from the second ring. Since the planetary transmission can thus, in particular in the case of a simultaneously closed clutch, be immovably blocked, a parking lock function can be realized by means of the additional blocking position and the clutch. For example, the clutch can be automatically closed, and the freewheel automatically moved into the blocking position, when the motor vehicle is parked, which is indicated for example in the case of an automatic transmission by means of a shift into the P setting. By means of the parking lock function realized with the aid of the intentional blocking of the planetary transmission, it is possible to reliably prevent the parked motor vehicle from unintentionally rolling away. No separate blocking of the drivetrain is necessary for this purpose, such that it is also possible for an associated actuator arrangement and sensor arrangement to be omitted. The operating situation of "parking" can thus be replicated in a particularly simple and structural-space-saving manner. As a result of the omission of a separate transmission lock as parking lock, it is furthermore possible for the number of components and the production costs to be reduced. By means of the blocking of the planetary transmission that can be intentionally brought about with the blocking setting, it is possible, with the aid of the freewheel that can be caused to assume three different switching positions, for a simple and structural-space-saving adaptation of the transmission characteristic of a planetary transmission of a motor vehicle transmission to different operating situations to be made possible.

The switching element is for example configured as a switching ring with switching fingers which engage into an intermediate space between the first ring and the second ring. In the freewheel position of the switching element, the respective switching fingers of the switching element may be positioned in a circumferential direction between two blocking bodies which are successive in the circumferential direction, preferably without making contact with the blocking bodies. In the blocking position, the switching element may have been rotated in one circumferential direction with respect to the preceding freewheel position in the circumferential direction until the blocking body has been clamped between the blocking contours and possibly the engaging switching finger. For the inactive position, the switching element may be rotated in the opposite circumferential direction until the switching finger engages on the other blocking body and pushes this down to such an extent that the blocking body can no longer engage into the second blocking contour. The first blocking contour offers sufficient space for the pushed-down blocking body in order that the blocking body can be pivoted through a sufficiently great pivot angle. The switching finger can in particular engage on two different blocking bodies which are arranged in succession in the circumferential direction, in order to realize the three switching positions of the freewheel. In particular, the switching element and/or the first ring and the second ring are configured to switch exclusively exactly three switching states. More than three switching states are not provided, and are also not necessary for the shifting of transmission gear ratios in the planetary transmission of the motor vehicle transmission, such that the structural design of the freewheel and the production costs can be kept low.

The switching element is particularly preferably coupled to the displacement unit such that, proceeding from a blocking position of the blocking bodies, in which, in the active setting of the rings, the blocking bodies are clamped in torque-transmitting fashion in the blocking position between the first blocking contour and the second blocking contour, and before the switching element tilts the blocking bodies into a freewheel position, initially the inactive setting is assumed. The switching element may initially be situated in a rotational angle position which corresponds to the blocking position, and out of which the switching element is moved, without engaging on the blocking body, in order to implement the freewheel position and/or the inactive position of the blocking bodies. This relative rotation of the switching element can be utilized in the displacement unit to bring about the inactive setting of the second blocking contour relative to the first ring, in which said blocking contour and first ring have been moved axially away from one another.

In particular, the switching element is coupled to the displacement unit such that, before an implementation of the blocking position of the blocking bodies, the active setting of the rings is assumed. When the switching element has tilted the blocking bodies out of the blocking position, the switching element may have been rotated to such an extent that this rotation can in turn be utilized to bring about the active setting of the rings, in which these have been moved axially toward one another. In the active setting of the rings, the switching element can tilt the blocking bodies into the blocking position again.

Preferably, the displacement unit has an axially immovable but rotatable setting ring with at least one setting ramp, in particular on both sides, and at least one counterpart ramp, in particular on both sides, wherein the setting ring is coupled to the switching element and the counterpart ramp is fastened to an axial rear side of the second blocking contour which points away from the second blocking contour, wherein, in particular, the counterpart ramp is decoupled from the blocking contour by a disengagement bearing for preventing a relative rotational movement of the displacement unit. When the switching element is rotated, the setting ring is also conjointly rotated. This in turn has the effect that the setting ramp of the setting ring can slide on the counterpart ramp. The setting ramp and the counterpart ramp form a ramp system, the axial extent of which can be varied in a manner dependent on the relative rotational situation thereof. This allows a conversion of the rotation of the switching element into an axial relative movement of the first ring with respect to the second ring in a simple and structural-space-saving manner. Between the ramps which act in different circumferential directions, there may be formed a plateau or a depression, the extent of which in the circumferential direction is adapted to the rotational angle range of the switching element in which the plateaus which point toward one another are intended to lie axially against one another for the active position, and/or to the rotational angle range of the switching element in which the plateaus which point toward one another are intended to engage axially into the corresponding depression for the inactive position.

The second blocking contour is particularly preferably spring-loaded with a spring force pointing away from the first ring, wherein, in particular, the second blocking contour is configured as a component which is separate from the rest of the second ring, and the separate second blocking contour is received in rotationally conjoint but axially relatively displaceable fashion in the rest of the second ring. By means of the acting spring force, the displacement unit seeks to push the second blocking contour and the first ring away from one another, or pull these away from one another, such that the displacement unit seeks to realize the inactive position of the rings. In this way, the release of the blocking bodies, which are possibly intensely clamped between the blocking contours, is assisted by the spring force. A separate actuator arrangement for actively displacing the rings from the active position into the inactive position can thus be dimensioned to be correspondingly smaller.

In particular, the spring force pointing away from the first ring is applied by a disk spring which engages on the second blocking contour. The disk spring can provide a high spring force whilst having a particularly small axial structural space requirement. It is possible for multiple disk springs to be provided one behind the other in a series and/or parallel configuration. Additionally, a bearing arrangement may be provided which allows a relative rotation of the setting ring with respect to the first ring and/or with respect to the second ring.

In particular, the second blocking contour has a slide ramp, which in the freewheel position can be caused to slide in one circumferential direction on the blocking body, and a blocking stop, which can be caused to abut in the other circumferential direction against the blocking body in order to block the rotational movement of the first ring with the second ring. In this way, freewheeling may be provided in one relative direction of rotation, which corresponds in particular to overrun operation, whereas blocking and a transmission of torque is provided in the opposite relative direction, which corresponds in particular to traction operation.

Preferably, the switching element has a blocking ramp, which acts in one circumferential direction so as to set the blocking element upright into the second blocking contour, and a holding contour, which acts in the other circumferential direction so as to hold the blocking element down against the first blocking contour. The gradient of the blocking ramp may in particular correspond to a gradient of a slide ramp of the second blocking contour, such that the blocking body, in the blocking position, can at one side lie areally against the slide ramp of the second blocking contour and/or can at the other side lie areally against the blocking ramp. The blocking body is thus received in the blocking position in a stable manner and can better support even relatively high torques to be transmitted. By means of the holding contour, the blocking body is merely held down, possibly counter the spring force of a spring element which engages on the blocking body, such that the holding contour can in particular engage merely linearly and not areally on the blocking body. Unnecessary friction resistances during the pushing-down of the blocking body can thus be avoided. Here, use is made of the recognition that the switching element engages at different tangential sides on a different blocking body for the respective switching position, such that the geometry of the respective tangential side can be optimized for the demand profile required in the respective switching position.

The switching element is particularly preferably coupled to an in particular electromechanically actuatable actuator for rotating the switching element. When a gear ratio change has been initiated, a signal for the gear ratio change can be processed in the actuator in order to switch the freewheel into the switching position that corresponds to the desired operating situation.

In particular, the actuator is configured to switch the switching element in a manner dependent on a switching state of a clutch for rotationally conjointly connecting two transmission components of the planetary transmission. In this way, before a rotation of the switching element, the actuator can check whether the switching position that is to be implemented, in particular the blocking position, can actually be sensibly engaged based on the present switching state of the clutch. This allows an additional safety check which, for example, can reliably prevent immovable blocking of the planetary transmission during normal travel or else in the event of a system failure of some other safety component. Fail safety is thus ensured for the parking lock function.

The actuator preferably has a rotatable switching drum with a guide groove which runs in particular in closed fashion in a circumferential direction, wherein the switching element has a guide pin which is inserted in the guide groove, wherein an axial relative movement of the guide pin with respect to the switching drum can be converted in the guide groove into a limited rotational movement of the switching element along its circumferential direction. Owing to the mechanical coupling of the switching drum, shifting of transmission gear ratios by means of the freewheel can be realized with little outlay in terms of construction and in a small structural space. Furthermore, by means of the switching drum, a clutch for rotationally conjointly connecting two transmission components of the planetary transmission can simultaneously be actuated, such that the switching position of the freewheel is automatically adapted to the switching state of the clutch by means of mechanical positive coupling realized by way of the switching drum.

The invention furthermore relates to a motor vehicle transmission for coupling an electric machine to a drivetrain of an electrically driveable motor vehicle, having a planetary transmission for converting a torque that can be introduced by the electric machine, wherein the planetary transmission has, as transmission components, a sun gear, a ring gear arranged coaxially with respect to the sun gear, at least one planet gear which meshes with the sun gear and with the ring gear, and a planet carrier which bears the planet gear, a clutch for rotationally conjointly connecting two transmission components, in particular the ring gear to the planet carrier, and a switchable freewheel which may be designed and refined as described above, wherein the freewheel is configured to selectively bring about freewheeling and/or blocking of a transmission component, in particular of the sun gear, with respect to a reference component, in particular a static housing, during traction operation. Owing to the increase, achieved by the displacement unit, of the axial spacing of the second blocking contour of the second ring to the first ring, the torque-transmitting blocking of the first ring with the second ring of the freewheel can be eliminated with little wear and with a small structural space requirement, such that an adaptation of the transmission characteristic of a planetary transmission of a motor vehicle transmission to different operating situations is made possible with little wear and in a structural-space-saving manner.

Preferably, clamping of the blocking bodies of the freewheel by torques, pointing toward one another, of the first blocking contour and of the second blocking contour is allowed in a park setting for the motor vehicle. The motor vehicle transmission can intentionally, in the blocking contours that engage on one another via the blocking bodies, allow mutually oppositely directed torques, which can arise in particular in the event of the motor vehicle being parked on a gradient. By means of the axial displacement of the second blocking contour with respect to the first ring into the inactive position, in which said second blocking contour and first ring are spaced apart from one another to a relatively great extent, the freewheel can be switched out of the blocking position even in case of blocking bodies being intensely clamped in the blocking contours. In this way, it is possible in particular to omit a separate blocking bolt, which is provided for immobilizing blocking of the motor vehicle transmission, in particular of the planetary transmission, and to omit an associated actuator arrangement. The blocking of the motor vehicle transmission can be achieved by means of the freewheel switched into the blocking position, and the closed clutch, on their own.

The invention furthermore relates to the use of a freewheel, which may be designed and refined as described above, in a planetary transmission, which is operable as a transmission with 2 gear ratios, in a drivetrain of a motor vehicle, wherein, in particular, the planetary transmission is part of a motor vehicle transmission that may be designed and refined as described above. By means of the blocking of the planetary transmission that can be intentionally brought about with the blocking setting, it is possible, with the aid of the freewheel that can be caused to assume three different switching positions, for a simple and structural-space-saving adaptation of the transmission characteristic of the planetary transmission to different operating situations to be made possible. Owing to the increase, achieved by the displacement unit, of the axial spacing of the second blocking contour of the second ring to the first ring, the torque-transmitting blocking of the first ring with the second ring of the freewheel can be eliminated with little wear and with a small structural space requirement, such that an adaptation of the transmission characteristic of a planetary transmission of a motor vehicle transmission to different operating situations is made possible with little wear and in a structural-space-saving manner.

BRIEF DESCRIPTION OF THE DRAWING FIGURES

Figure 2:
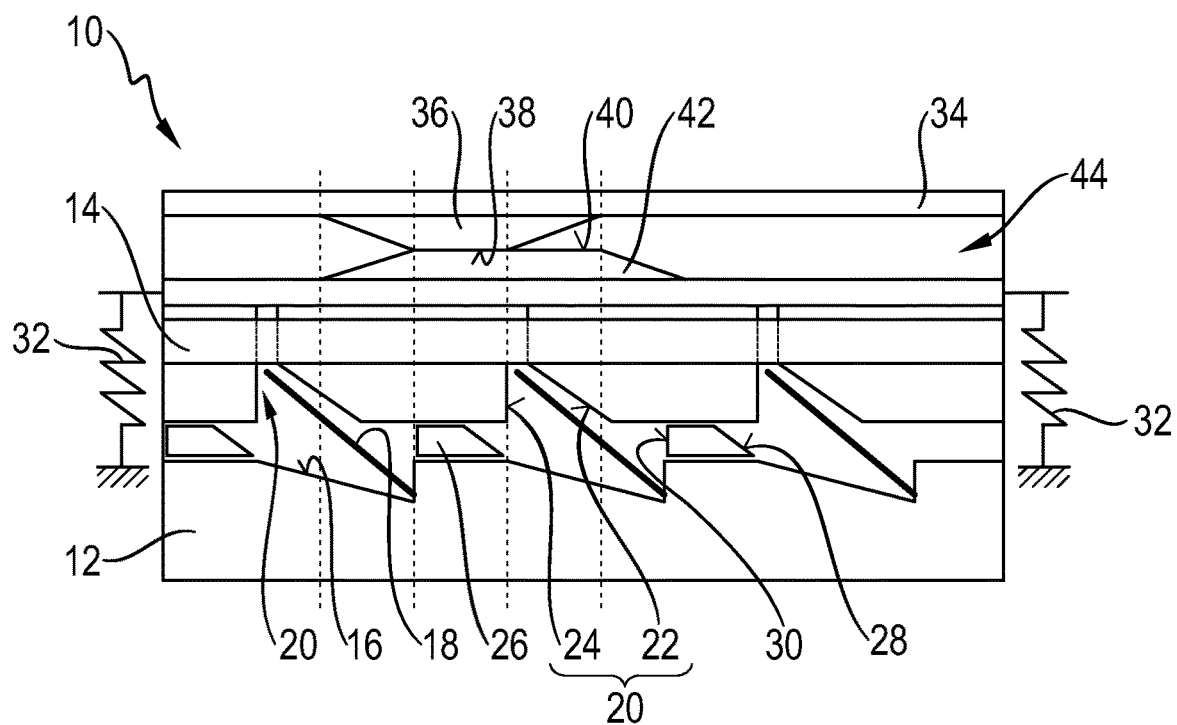
Figure 3:
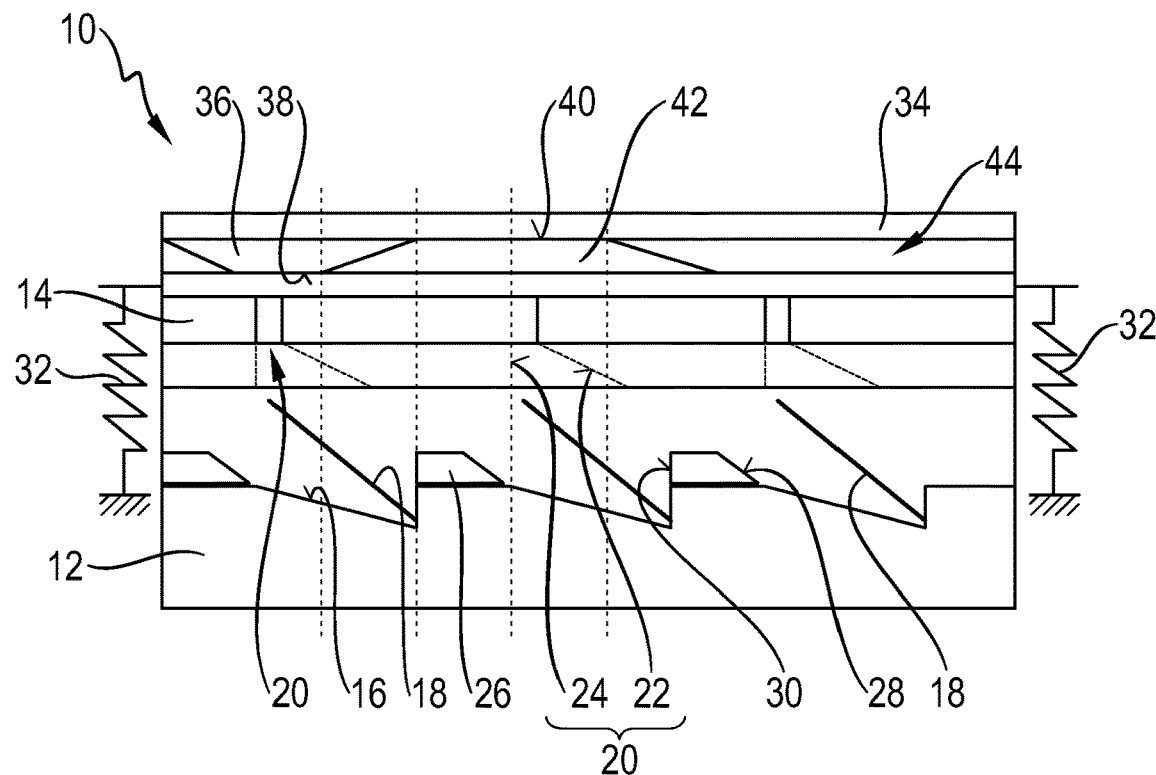
Figure 4:
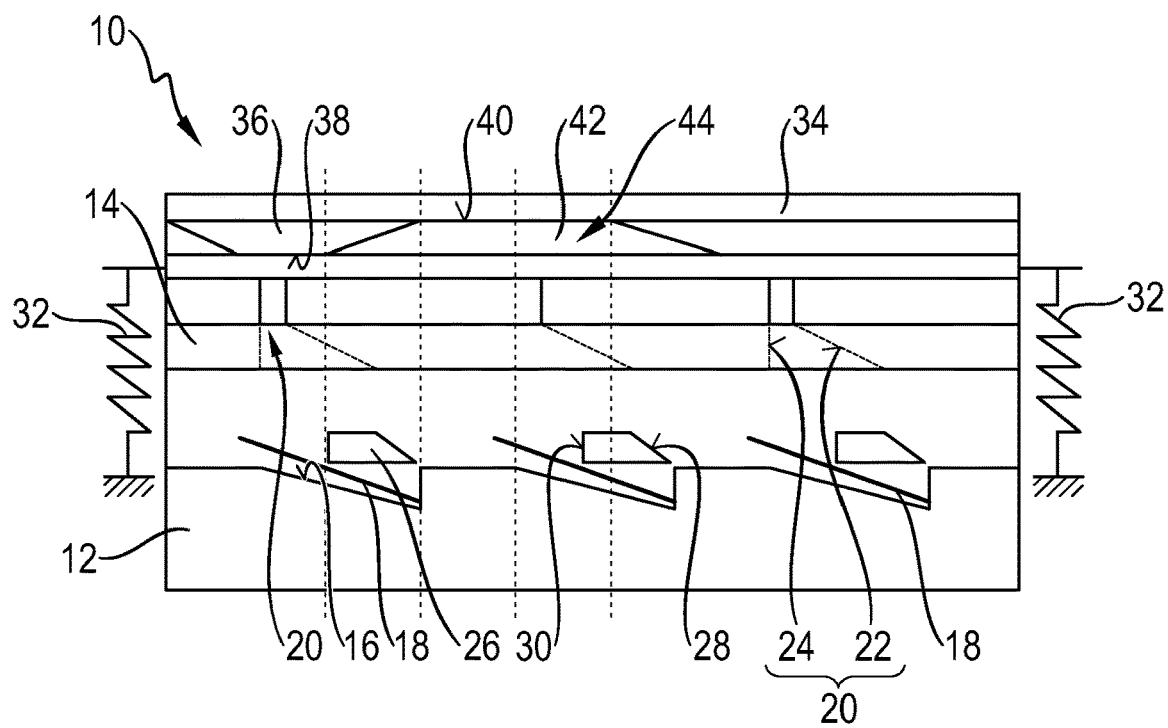

The invention is explained below by way of example with reference to the appended drawings on the basis of preferred exemplary embodiments, wherein the features presented below may in each case individually or in combination represent an aspect of the invention. In the drawings:

FIG. 1 shows a schematic developed side view of a part of a freewheel in a blocking position, FIG. 2 shows a schematic developed side view of the freewheel from FIG. 1 in a freewheel position, FIG. 3 shows a schematic developed side view of the freewheel from FIG. 2 in an inactive position, and FIG. 4 shows a schematic developed side view of the freewheel in an inactive position in the event of a brief rotation.

DETAILED DESCRIPTION OF THE INVENTION

The freewheel 10 illustrated in a simplified illustration in FIG. 1 for a planetary transmission of a motor vehicle transmission has a first ring 12, which is positioned for example at a transmission side, and a second ring 14, which is axially offset at the housing side, and relatively rotatable, with respect to the first ring 12. The freewheel 10 can be installed in a planetary transmission of a motor vehicle transmission in order, by means of a selective coupling of a transmission component of the planetary transmission to a housing, to change a transmission ratio of the planetary transmission and thus engage a different transmission gear ratio. For example, the first ring 12 is connected to a sun gear of the planetary transmission, whereas the second ring 14 is connected to the housing.

The first ring 12 has a first blocking contour 16, in which a blocking body 18 configured as a pawl is mounted so as to be tiltable. The blocking body 18 can in particular be preloaded by means of a spring element in one of the tilting directions of the blocking body 18, in particular in the direction of the second ring 14. The second ring 14 has a second blocking contour 20 which is designed as a separate component and into which the free end of the blocking body 18 can engage. The second blocking contour 20 has, on one tangential side, a slide ramp 22 on which the blocking body 18 can slide during a relative rotation without blocking the second ring 14 with the first ring 12 for a transmission of torque. On the opposite tangential side, the second blocking contour 20 has a blocking stop 24 on which the blocking body 18 can abut during an oppositely directed relative rotation and blocks the second ring 14 with the first ring 12 for a transmission of torque.

Provided between the first ring 12 and the second ring 14 is a rotatable switching element 26 for switching different operating modes for the freewheel 10. In the blocking position of the blocking bodies 18 illustrated in FIG. 1, the switching element 26 lies with a blocking ramp 28 against the blocking body 18, such that the blocking body 18 is held immovably between the blocking ramp 28 of the switching element 26 and the slide ramp 22 of the second blocking contour 20. In the blocking position, the freewheel can transmit a torque, and couple the first ring 12 fixedly in terms of movement to the second ring 14, in both relative directions of rotation. At a tangential side pointing away from the blocking ramp 28, the switching element 26 has a holding contour 30.

In the exemplary embodiment illustrated, the second blocking contour 20 of the second ring 14 is preloaded by means of at least one spring element 32, configured for example as a disk spring, in an axial direction away from the first ring 12 with a spring force. The second blocking contour 20, which is configured as a separate component, is inserted in a rotationally conjoint but axially relatively movable manner in the second ring 14. The second blocking contour 20 of the second ring 14 is pushed by the spring element 32 against a setting ring 34. The setting ring 34 has bidirectionally acting setting ramps 36 which protrude toward the second ring 14 in the axial direction and which, with their respective plateau 38, lie against a counterpart plateau 40 of a bidirectionally acting counterpart ramp 42 which is fixedly connected to an axial side, pointing away from the first ring 12, of the second blocking contour 20. The setting ring 34 is connected to the switching element 26, such that a rotation of the switching element 26 leads to a rotation of the setting ring 34, whereby the setting ramp 36 can slide on the counterpart ramp 42 in order to vary the axial relative position thereof. The setting ring 34, the setting ramps 36, the counterpart ramps 42 and the spring element 32 that engages on the second ring 14 form a displacement unit 44 by means of which, during a rotation of the switching element 26, the axial relative position of the first ring 12 with respect to the second ring 14 can additionally be varied. In addition or alternatively, the displacement unit 44 may be configured as a ball-ramp system.

In the freewheel position of the blocking bodies 18 illustrated in FIG. 2, the switching element 26 is positioned in a circumferential direction between two blocking bodies 18 without interacting with the blocking bodies 18. In the freewheel position, the blocking body 18 that can be caused to engage into the second blocking contour 20 can, in one relative direction of rotation, slide on the slide ramp 22 of the second blocking contour 20 and freewheel, whilst in the opposite relative direction of rotation, the blocking body 18 abuts against the blocking stop 24 of the second blocking contour 20 and blocks the first ring 12 with the second ring 14 in torque-transmitting fashion. Here, the switching element 26 has conjointly rotated the setting ring 34, whereby the plateau of the setting ramp 36 has slid on the counterpart plateau 40 of the counterpart ramp 42 without a change in the axial spacing of the second blocking contour 20 of the second ring 14 to the first ring 12.

In the freewheel position illustrated in FIG. 3, the switching element 26 has been rotated somewhat further, whereby the setting ramp 36 and the counterpart ramp 42 can slide on one another at their flanks which point toward one another, outside the plateau 38 and the counterpart plateau 40. The setting ramp 36 and the counterpart ramp 42 may engage into corresponding depressions on the respective other axial side. The spring element 32 pushes or pulls the second blocking contour 20 of the second ring 14 closer to the setting ring 34, whereby the second blocking contour 20 moves away from the first ring 12 in an axial direction. In this way, the freewheel 10 can change from its active position into its inactive position. The blocking bodies 18, which are still upright and which were in particular clamped with a significant tangential normal force in a circumferential direction between the first blocking contour 16 and the second blocking contour 20, have been able to slide at a favorable angle and with little wear on the blocking stop 24 during the axial displacement of the second blocking contour 20 of the second ring 14 with respect to the first ring 12, until the blocking bodies 18 pass out of engagement with the second blocking contour 20, without tilting of the blocking bodies 18 having occurred for this purpose.

In the inactive position of the blocking bodies 18 illustrated in FIG. 4, the switching element 26 has, by means of the holding contour 30 pointing away from the blocking ramp 28, pushed the respective blocking bodies 18 into the first blocking contour 16, such that the blocking body 18 has been held out of the second blocking contour 20. In this way, a transmission of torque between the first ring 12 and the second ring 14 is interrupted, and freewheeling is provided, in both relative directions of rotation. The first ring 12 and the second blocking contour 20 of the second ring 14 are still situated in their relatively greatly spaced-apart inactive position. If the freewheel 10 is to again implement the blocking position of the blocking bodies 18 as illustrated in FIG. 1 and/or the freewheel position of the blocking bodies 18 as illustrated in FIG. 2, the more closely spaced active setting can be restored again during the movement, required for this purpose, of the switching element 26.

What is claimed:

1. A freewheel for changing a transmission characteristic of a planetary transmission for a motor vehicle transmission, said freewheel comprising:
    a first ring which has a first blocking contour on a first axial side,
    a second ring which is rotatable relative to the first ring and which has a second blocking contour on a second axial side pointing toward the first axial side of the first ring,
    tiltable blocking bodies which are configured to engage into the first blocking contour and into the second blocking contour,
    a switching element configured for tilting the blocking bodies, and
    a displacement unit for axially displacing the second blocking contour relative to the first ring between an active setting, which is axially approximated to the first ring and in which a blocking setting of the blocking bodies can be established which transmits torque between the first ring and the second ring, and an inactive setting, which is axially remote from the first ring and in which torque-transmitting blocking of the first ring with the second ring is prevented in any setting of the blocking bodies,
    wherein (i) in a blocking position of the switching element, the switching element clamps the blocking bodies immovably to the first blocking contour and to the second blocking contour, (ii) in a freewheel position of the switching element, the switching element allows unidirectional freewheeling, and (iii) in an inactive position of the switching element, the switching element holds the blocking bodies down on the first ring so as to be spaced apart from the second ring.

2. The freewheel as claimed in claim 1, wherein the switching element is coupled to the displacement unit in order to establish the active setting, the inactive setting and the blocking setting in a manner dependent on a rotational angle of the switching element.

3. The freewheel as claimed in claim 1, wherein the switching element is coupled to the displacement unit such that, proceeding from the blocking position of the blocking bodies, in which, in the active setting of the first and second rings, the blocking bodies are clamped in torque-transmitting fashion in the blocking position between the first blocking contour and the second blocking contour, and before the switching element tilts the blocking bodies into the freewheel position, initially the first and second rings are in the inactive setting.

4. The freewheel as claimed in claim 3, wherein the switching element is coupled to the displacement unit such that, before an implementation of the blocking position of the blocking bodies, the rings are in the active setting.

5. The freewheel as claimed in claim 1, wherein the displacement unit has an axially immovable but rotatable setting ring with at least one setting ramp on both sides, and at least one counterpart ramp on both sides, wherein the setting ring is coupled to the switching element and the counterpart ramp is fastened to an axial rear side of the second blocking contour which points away from the second blocking contour, wherein the counterpart ramp is decoupled from the second blocking contour for preventing a relative rotational movement of the displacement unit.

6. The freewheel as claimed in claim 1, wherein clamping of the blocking bodies of the freewheel by torques, pointing toward one another, of the first blocking contour and of the second blocking contour is allowed in a park setting for a motor vehicle.

7. A freewheel for changing a transmission characteristic of a planetary transmission for a motor vehicle transmission, said freewheel comprising:
   a first ring which has a first blocking contour on a first axial side,
   a second ring which is rotatable relative to the first ring and which has a second blocking contour on a second axial side pointing toward the first axial side of the first ring,
   tiltable blocking bodies which are configured to engage into the first blocking contour and into the second blocking contour,
   a switching element configured for tilting the blocking bodies, and
   a displacement unit for axially displacing the second blocking contour relative to the first ring between an active setting, which is axially approximated to the first ring and in which a blocking setting of the blocking bodies can be established which transmits torque between the first ring and the second ring, and an inactive setting, which is axially remote from the first ring and in which torque-transmitting blocking of the first ring with the second ring is prevented in any setting of the blocking bodies,
   wherein the second blocking contour is spring-loaded with a spring force pointing away from the first ring, wherein the second blocking contour is configured as a component which is separate from the rest of the second ring, and the separate second blocking contour is received in rotationally conjoint but axially relatively displaceable fashion in the rest of the second ring.

8. The freewheel as claimed in claim 7, wherein the spring force pointing away from the first ring is applied by a disk spring which engages on the second blocking contour.

* * * * *